May 1, 1951  R. D. JOHNSON  2,551,005
SURFACE FINISHING THERMOPLASTIC MATERIALS
Filed Dec. 4, 1946
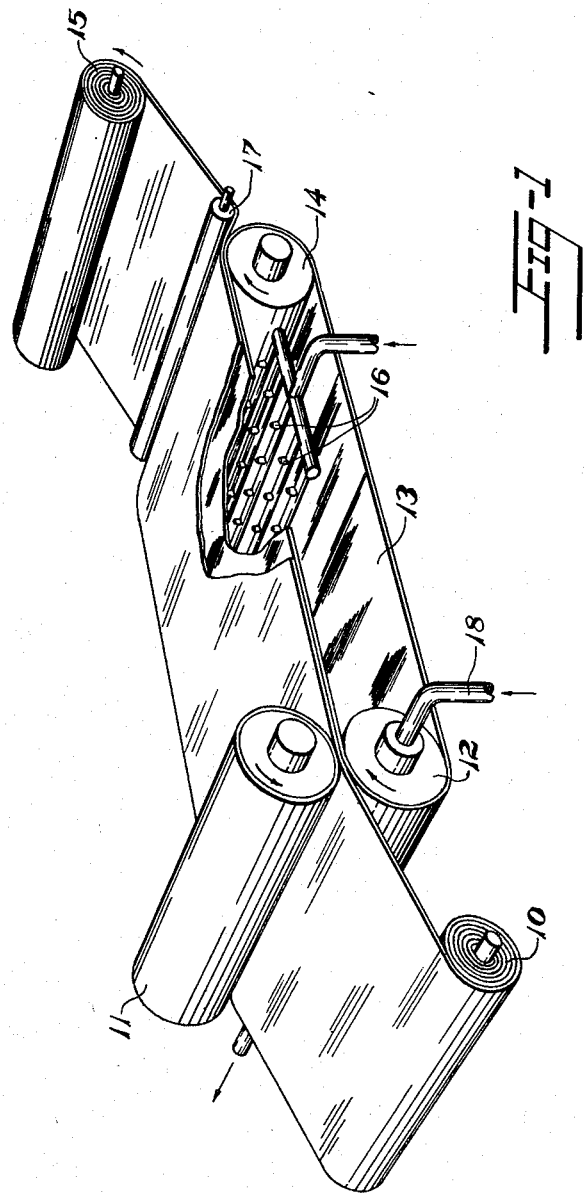
Inventor
Ray D. Johnson
By Robert W. Furlong
Atty.

Patented May 1, 1951

2,551,005

UNITED STATES PATENT OFFICE 2,551,005

SURFACE FINISHING THERMOPLASTIC MATERIALS

Ray D. Johnson, St. Louis Park, Minn., assignor to The B. F. Goodrich Company, New York, N. Y., a corporation of New York Application December 4, 1946, Serial No. 714,008

6 Claims. (Cl. 18—48)

This invention relates to the imparting of surface finishes to thermoplastic materials and particularly to mirror or embossed finishes on plasticized polyvinyl chloride compounds.

One object of this invention is the production of special finishes for solid thermoplastic materials, the special finishes comprising among others a mirror-like finish or any of a great number of embossed finishes. It is a further object of this invention to produce the finishes by softening the face of the thermoplastic material while the body of the material is maintained at a lower temperature, making the desired impression while the surface is softened, and then subsequently cooling the material. Any thermoplastic material that may be calendered or tubed through a die unit may be processed in the manner of this invention.

Special finishes have been previously manufactured by any of a number of methods; some of the most common methods used are molding, calendering, and extruding. In the above mentioned methods the thermoplastic material has been heated all the way through while having the desired surface finish imparted to it.

In this invention I have found that the desired surface finishes may be obtained by using a continuous metal belt as will be described in subsequent paragraphs. The plastic material to be finished is heated to the softening point at the surface only, and the body of the material remains at a lower temperature. As an example, the method of imparting a mirror finish to a plasticized polyvinyl chloride composition will be described.

In the drawing, Fig. 1 is a side elevation of the apparatus used to produce mirror finished sheeting.

In Fig. 1 the stock roll 10 holds the precalendered stock which is to be surface finished. Roll 11 is a spring backed or heavy floating roll which presses against roll 12. Roll 11 is a cold roll and is preferably rubber covered when a plasticized polyvinyl chloride composition is being processed. It has been found that a more uniform finish is imparted to the thermoplastic material if a rubber covered roll is used. The uniform pressure afforded by the cushion of the rubber-covered roll makes for a smooth, homogeneous surface finish. Also, it should be pointed out that when producing embossed finishes, a cushion produced by a rubber-covered roll makes it possible to produce deep embossing without the risk of cutting through the sheet.

Roll 12 is a heated drive roll and supports one end of the continuous belt 13. This roll 12 may be heated by means of steam pipes 18. Roll 12 is heated to from about 250 to 500° F., that is, to a sufficient temperature to soften the surface of the thermoplastic material being treated. The continuous belt may best be made from material such as a corrosion-resistant metal, for example stainless steel or chrome plated steel, and the desired molding surface must appear on the outer surface of this continuous belt. Idler roll 14 supports the other end of the continuous belt 13. Roll 15 is used to roll up the mirror finished or patent-leather-like sheeting.

In carrying out the process, precalendered, plasticized polyvinyl chloride sheeting unrolls from the stock roll 10 and passes between rolls 11 and 12. Roll 12, which may be maintained at a temperature of 360° F., heats the metal belt which in turn heats the surface of the sheeting to a depth up to ½ the thickness of the sheet. The metal belt could be heated by other means than the hot roll, for example a preheat zone could be employed with the belt anywhere between the cooling zone and the point where the thermoplastic sheet first meets the continuous belt by using gas burners, electric unit heaters or the like. Since roll 11 is a cold roll, the body of the sheeting never reaches the softening point, but the surface of the sheet adjacent to the metal belt does reach the softening point and after being pressed against the belt by the action of rolls 11 and 12 takes the smooth, mirror finish of the polished metal belt 13.

The sheeting remains in adherent contact with the metal belt and follows the belt as far as the stripping point 17. While the sheeting follows the belt, the temperature of the sheeting and belt is reduced sufficiently to allow easy removal of the sheeting from the belt. In order to obtain a permanent surface finish of the sheeting, it is necessary to allow the sheeting to remain in contact with the metal belt until after sufficient cooling; it is possible to easily strip the finished sheeting. In general, the temperature of the heated surface of the thermoplastic material must be reduced below the softening point of the thermoplastic material before it is stripped from the belt. The precise temperature to which the surface is cooled is not critical so long as it is below the softening point of the thermoplastic material; in some cases, the material may be cooled even below room temperature. Air jets 16 can be used to create a cold zone on the continuous belt, if it is deemed necessary to use fast rates of feed. If a sufficiently long belt is used, no air jets would be needed, because the surrounding air would cool the belt and sheeting. After the finished sheeting is stripped from the continuous belt, it is rolled up on roll 15.

Although this complete description of the manufacture of a mirror finished plasticized polyvinyl chloride composition has been outlined, it must be understood that any desired configuration may be obtained by preparing the properly designed continuous belt. Also, it should be evident that a drum or roll may be used instead of the continuous metal belt described. Tubing, sheeting and other forms may be processed by making the necessary changes in the rolls and continuous belt. Also, the process is adaptable to many and varied thermoplastic materials such as the acrylic resins, vinyl resins, or other like materials. Any of the usual fillers and pigments may be added to the resins.

Permanent surface finishes can be imparted to solid thermoplastic materials by using this continuous belt principle; the finishes are permanent only if the thermoplastic material cools while in adherent contact with the cold surface of the continuous belt. Since the sheet need be softened only on the surface and since it is necessary to cool the sheet and belt before they are separated one from the other, it is evident that this process would be faster and more economical than former methods which involve heating the plastic material all the way through. The method described herein does not require heavy, expensive calendering or molding equipment. The metal belt and rolls described above make a continuous process possible. The surface finishes which are possible to produce by this process lend beauty and sales appeal to the various products made from the thermoplastic materials. The embossing may be to a depth of one-half of the thickness of the thermoplastic material. For instance, the embossing may be as deep as .040" on .080" sheeting. Moreover, in general, it will be found that the present invention finds its greatest utility in the finishing of relatively thin sheets of thermoplastic material, that is, up to about 0.1" in thickness, the depth of the embossing in such case (hence the depth to which the thermoplastic material is heat-softened) being no greater than 0.05". For best results, it has been found that the thermoplatic sheet material should be heat-softened to a depth of no more than about 0.03" for an 0.1" sheet, or about 30% of the thickness of the sheet. Any of a great number of surface finishes for solid thermoplastic materials may be obtained in a continuous, relatively inexpensive process as those described therein. It must be remembered that in this process only the surface of the material is softened and the body of the material is maintained in a solid condition at a lower temperature. Since the body of the material is maintained at a lower temperature, the body acts as a reenforcement for the sheet and prevents an increase in width and length while the sheet is being processed. It would be possible to impart a finish to both sides of the sheet by treating one side at a time using the process just outlined.

Although I have herein disclosed specific embodiments of my invention, I do not intend to limit myself solely thereto, but to include all of the obvious variations and modifications falling within the spirit and scope of the appended claims.

I claim:
1. The method of continuously providing a surface finish for a solid plasticized polyvinyl chloride sheet which comprises progressively heating one entire surface only of the said sheet to at least the softening point by passing the said sheet in contact with a heated mirror finished, continuous, corrosion-resistant metal belt between a pair of squeeze rolls; cooling the said sheet and the belt while in contact and free from external pressure to a temperature below the softening point of the said sheet; and progressively stripping the said sheet from the said belt.

2. The method of providing a surface finish for a dry, pre-formed body of solid thermoplastic material which comprises progressively heating one surface only of the said body to a temperature at least as high as the softening point while maintaining the remainder of the said body in a solid condition at a lower temperature by momentarily pressing progressive adjacent localized zones of said body against a heated travelling metal surface having the desired configuration, releasing said pressure while maintaining said body and said surface in contact with each other, cooling said surface and said body while in contact with each other and free from external pressure, said surface being maintained substantially in a single plane throughout its contact with said body, and progressively stripping said cooled body from said surface.

3. The method of providing a surface finish for a dry, pre-formed body of solid thermoplastic material which comprises progressively heating one surface only of the said body to a temperature at least as high as the softening point while maintaining the remainder of the said body in a solid condition at a lower temperature by momentarily pressing progressive adjacent localized zones of said body against a heated travelling metal surface having a mirror finish, releasing said pressure while maintaining said body and said surface in contact with each other, cooling said surface and said body while in contact with each other and free from external pressure, said surface being maintained substantially in a single plane throughout its contact with said body, and progressively stripping said cooled body from said surface.

4. The method of providing a surface finish for a dry, pre-formed body of solid thermoplastic material which comprises progressively heating one surface only of the said body to a temperature at least as high as the softening point while maintaining the remainder of the said body in a solid condition at a lower temperature by momentarily pressing progressive adjacent localized zones of said body against a heated, travelling metal surface having an embossed finish, releasing said pressure while maintaining said body and said surface in contact with each other, cooling said surface and said body while in contact with each other and free from external pressure, said surface being maintained substantially in a single plane throughout its contact with said body, and progressively stripping said cooled body from said surface.

5. The method of providing a surface finish for a solid, pre-formed, plasticized polyvinyl chloride sheet which comprises progressively heating one entire surface only of said sheet to at least the softening point by passing said sheet between a pair of squeeze rolls and in contact with an embossed, continuous, corrosion-resistant metal belt heated to from 250 to 500° F.; cooling said sheet and belt while in contact and free from external pressure to a temperature below the softening point of the said sheet; and progressively stripping said sheet from said belt.

6. The method of providing a surface finish for a solid, pre-formed, plasticized polyvinyl chloride sheet which comprises progressively heating one entire surface only of said sheet to at least the softening point thereof by passing said sheet between a pair of squeeze rolls while in contact with a metal belt having the desired configuration and heated to from 250 to 500° F.; cooling said sheet and belt while in contact and free from external pressure to a temperature below the softening point of the said sheet; and progressively stripping said sheet from said belt.

RAY D. JOHNSON.

REFERENCES CITED

The following references are of record in the file of this patent:

UNITED STATES PATENTS

| Number | Name | Date |
|---|---|---|
| 988,981 | Danzer | Apr. 11, 1911 |
| 1,962,683 | Dreyfus | June 12, 1934 |
| 2,075,735 | Loomis | Mar. 30, 1937 |
| 2,218,227 | Winnek | Oct. 15, 1940 |
| 2,442,443 | Swallow | June 1, 1948 |
| 2,451,597 | Wheeler | Oct. 19, 1948 |
| 2,463,370 | Flaster | Mar. 1, 1949 |